Feb. 20, 1945.  A. C. LIND ET AL  2,369,911
SEAL FOR JOURNAL BEARINGS
Filed Aug. 27, 1942
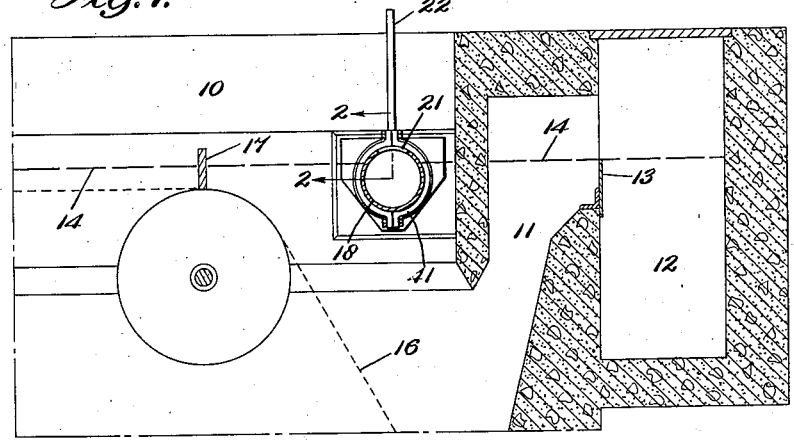
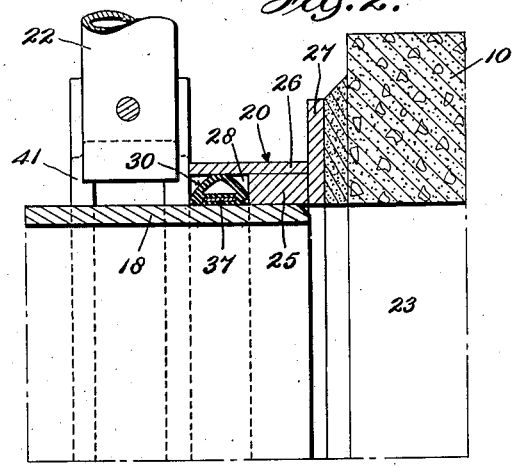
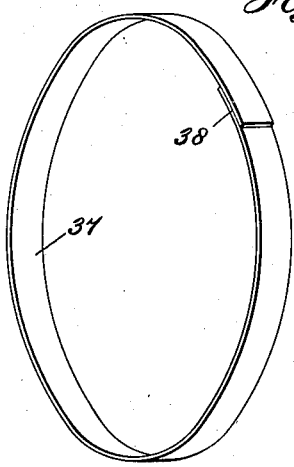
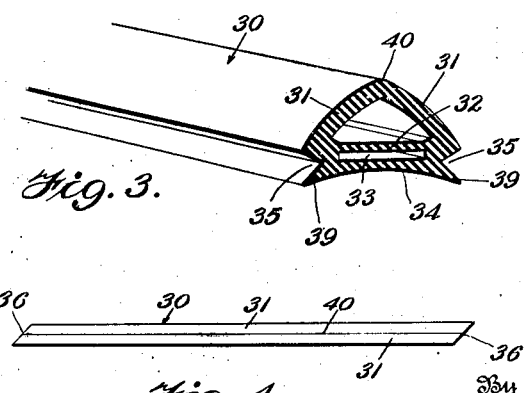
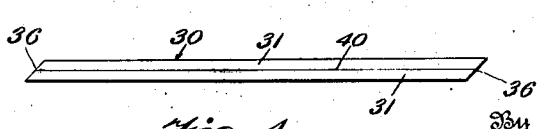
Inventors
Arthur C. Lind and
Frank G. Stuller,
Attorney Patented Feb. 20, 1945

2,369,911

UNITED STATES PATENT OFFICE 2,369,911

SEAL FOR JOURNAL BEARINGS

Arthur C. Lind and Frank G. Stuller, Milwaukee, Wis., assignors to Chain Belt Company, Milwaukee, Wis., a corporation of Wisconsin Application August 27, 1942, Serial No. 456,398

9 Claims. (Cl. 285—97.1)

The invention relates to liquid seals for rotating conduits and the like, and finds particular use in connection with scum removing conduits for sedimentation apparatus of the type disclosed in the co-pending application of Frank G. Stuller, filed February 20, 1942, Serial No. 431,759, now Patent No. 2,337,859 granted December 28, 1943, having been developed especially for use therewith.

One of the principal objects of the invention is to provide a seal of a relatively simple and inexpensive construction which, while easily assembled and disassembled, will effectively prevent the unwanted transfer of liquid from without to within a rotatable or oscillatable conduit, or vice versa, through a bearing or joint therefor.

A further object of the invention is to provide a liquid seal between a stationary and a rotatable member, comprising a rubber or similar sealing annulus carried by one of such members and slidably engaging the other with a substantially line contact, in which any tendency of the material of the sealing ring to roll or bunch at circumferential points is substantially eliminated, thus obviating binding of the rotatable member and cutting or scoring of the seal material, with a consequent lengthening of its life.

With the above and other objects in view which will appear as the description proceeds, the invention consists in the novel details of construction, and in the novel combinations and arrangements of parts more fully hereinafter disclosed.

Referring to the accompanying drawing forming a part of this specification, in which like reference characters designate like parts in all the views:

Figure 1 is a fragmentary longitudinal sectional view through a portion of a sedimentation tank equipped with a scum removing apparatus of the type disclosed in the said prior Stuller patent and which embodies sealing means in accordance with the present invention for preventing the undesired escape of liquid from the settling chamber into the scum conduit through the journal bearings for the latter;

Figure 2 is a fragmentary cross sectional view, on a somewhat larger scale, taken approximately on the plane indicated by the line 2—2 of Fig. 1, looking in the direction of the arrows;

Figure 3 is a sectional perspective view of a portion of the rubber sealing member in its original straight condition;

Figure 4 is a plan view, on a reduced scale, of the member in this form; and

Figure 5 is a perspective view of the metallic annulus for shaping and retaining the sealing member in operative position.

Referring briefly to Fig. 1, the sedimentation apparatus here illustrated as a typical setting for the use of the invention comprises a settling tank or chamber 10, conveniently of concrete, and having an outlet passage 11 discharging to an effluent channel 12 over an adjustable weir 13 by means of which the liquid level 14 within the chamber may be regulated. A sediment removing conveyer, indicated more or less diagrammatically at 16, is mounted within the chamber 10, the flights 17 of such conveyer preferably breaking the surface of the liquid on their return run whereby to move the scum and/or floating debris to a point adjacent the scum withdrawal pipe or conduit 18 at the outlet end of the chamber. As is more fully disclosed in the said Stuller Patent No. 2,337,859, this pipe extends transversely of the settling chamber at substantially the liquid level, being journalled at either end in bearings secured to the chamber walls, one of which, 20, is shown in section in Fig. 2. The circumferential wall of the said pipe is provided with one or more longitudinally extending apertures 21, normally positioned above the liquid level 14, which apertures may however, be moved to or below such level for scum removal purposes by arcuately moving the pipe in its bearings by means of the operating handle 22. The pipe 18 discharges the scum and/or debris into a conduit 23 formed in the wall of the chamber 10.

As further pointed out in the said Stuller patent, since the pipes 18 are of relatively large diameter—ranging from 8 to 16 inches or more—and since their movements are comparatively slow, infrequent and of small amplitude, there is no particular reason for providing extremely accurately fitting bearings for them, and therefore for the sake of simplicity and economy in construction and installation they may be formed of two concentric annuli 25 and 26, rolled from bars or strips of flat metal, and secured by welding or otherwise to an attachment plate 27. The inner annulus 25 constitutes a loosely fitting journal for the pipe 18, while the outer annulus 26, which as will be clear from Fig. 2 is of somewhat greater length than the inner one, provides, in conjunction with the said pipe, an annular recess 28 in which is located the sealing member 30 for preventing leakage of the liquid in chamber 10 through the loosely fitting bearing 25 to the interior of the pipe and the conduit 23.

As best shown in Fig. 3, the sealing member 30 is of hollow generally triangular cross section, the side walls 31 being preferably slightly convex, substantially as shown, while the base 32 is provided with a longitudinally extending passage 33 of rectangular cross section. This hollow material for the sealing member is supplied in the form of straight strips, in which condition the under surface 34 of the base is transversely concaved, as clearly indicated in said Fig. 3. The sides of the strips are longitudinally grooved, as indicated at 35, adjacent their juncture with the base 32; and the ends of the strips are preferably beveled as at 36 to provide a scarf joint when the strip is curved to annular form.

This curving of the straight strips is accomplished through the introduction of the split metal ring or band 37 through the passage 33 in the base wall 32 of the strip. This band is of a diameter not greater than the outside diameter of the pipe 18 and is somewhat resilient, with its ends overlapping as at 38 but not secured together. By separating these ends slightly, introducing one of them into the aperture 33 and then working the band therethrough, the straight sealing strip will be caused to assume annular form, as will be readily understood. The band 37 may be suitably greased or otherwise lubricated previous to entry in order to facilitate the threading operation.

In this annular condition the sealing member may be positioned upon the pipe 18 and introduced into the recess 28 of the bearing, in the manner disclosed in the said Stuller Patent No. 2,337,859. The provision of the grooves 35 along the sides produces the lips or flanges 39 which are quite yieldable, enabling the sealing member to be readily introduced onto the end of the pipe and worked along it to proper position. As this is done the bottom surface 34 of the base wall 32 flattens out, conforming to and gripping the pipe surface under the influence of the metallic band 37, as indicated in Fig. 2. The outside diameter of the sealing annulus—at the apex 40—is preferably slightly greater than the inside diameter of the recess 28 so that upon introduction thereinto the sealing member will be slightly flattened and compressed in the radial direction, which is readily permitted by the hollow construction. While the apex is thus slightly flattened, as shown in Fig. 2, it nevertheless makes an approximately line contact with the inner surface of the recess 28, and in conjunction with the resilient metal band 37 which causes the base to tightly grip and move with the pipe, prevents bunching, rolling and cutting of the rubber seal.

The open end of the recess 28 may be closed when the parts are in operative position by a split collar 41 which carries the operating handle or lever 22, as in the said Stuller patent.

While in compliance with the patent statutes one embodiment of the invention has been illustrated and described for purposes of disclosure, it is obvious that those skilled in the art may vary the precise details of construction and arrangement of the parts without departing from the spirit of the invention.

What is claimed is:

1. Fluid sealing means for a journal joint between a circumferentially movable conduit and a bearing structure therefor which structure provides an annular recess concentric with said conduit, said sealing means comprising a yieldable annulus of substantially triangular cross section disposed in said recess with the apex of the triangle slidably engaging the circumferential surface of one of the elements in a substantially line contact while the base of said triangle engages the opposed circumferential surface of the companion element, said base being provided with a circumferentially extending passage; and a clamping annulus in said passage firmly seating said base upon said opposed circumferential surface.

2. Fluid sealing means for a journal joint between a rotatable conduit or the like and a bearing structure therefor which structure provides an annular recess concentric with the rotatable member, said sealing means comprising a resilient non-metallic annulus of substantially hollow-triangular cross section disposed in said recess under light radial compression, with the apex of the triangle slidably engaging the circumferential surface of one of the elements in a substantially line contact and the base of the triangle seated against the opposed circumferential surface of the companion element, said base being provided with a separate circumferentially extending passage; and a resilient metal annulus removably positioned in and filling said passage to firmly frictionally engage said base with said opposed circumferential surface.

3. Fluid sealing means for a journal joint between a rotatable conduit or the like and a bearing structure therefor which structure provides an annular recess adjacent the journal and concentric with the rotatable member, said sealing means comprising a resilient non-metallic annulus of substantially hollow-triangular cross section disposed in said recess under light radial compression, with the apex of the triangle slidably engaging the circumferential surface of said annular recess and the base of the triangle seated upon the circumferential surface of said rotatable member, said base being provided with a separate circumferentially extending passage, and also with readily flexible circumferential lips or flanges to facilitate its entry on and removal from said member; and a split metal annulus removably positioned in and filling said base passage to firmly frictionally engage said base with said rotatable member.

4. Fluid sealing means for a journal joint between a rotatable conduit or the like and a bearing structure therefor having an annular recess concentric with the rotatable member, said sealing means comprising a resilient non-metallic annulus of substantially hollow-triangular cross section disposed in said recess under light radial compression, with the apex of the triangle engaging the circumferential surface of said annular recess in a substantially line contact and the base of the triangle seated upon the circumferential surface of said rotatable member, said annulus having exterior circumferential grooves adjacent the juncture of the base with the sides of the triangle providing readily flexible circumferential flanges at the ends of the base, and said base being provided with a separate circumferentially extending passage; and a split resilient metallic annulus removably positioned in and filling said base passage to firmly clamp the base upon said rotatable member.

5. An element for the formation of annular sealing members for liquid seals, comprising a straight strip of resilient non-metallic material of substantially hollow-triangular cross section, the base of which is provided with a separate longitudinally extending passage for the reception of a split metal shaping and retaining annulus, and the outer surface of said base being transversely concave.

6. An annular sealing element for liquid seals, comprising a resilient non-metallic member of substantially hollow-triangular cross section, having an apex portion for substantially linear sliding engagement with a surface of a member to be sealed, and the base of said resilient member being provided with a separate longitudinally extending passage; and a metal shaping and retaining annulus removably positioned in said passage.

7. An annular sealing element for liquid seals, comprising a resilient non-metallic member of substantially hollow-triangular cross section, having an apex portion for substantially linear sliding engagement with a circumferential surface of a member to be sealed, the base of which resilient member is provided with a separate circumferentially extending passage, and the sides of which are provided with circumferential grooves forming readily flexible flanges at the ends of said base for facilitating introduction of the sealing element on and its removal from another member to be sealed; and a split metal shaping and retaining annulus removably positioned in said base passage.

8. In a seal for preventing leakage of fluid through a joint between an at least partially submerged rotatable conduit section and a stationary conduit section, a stationary recessed element concentric with and overhanging said rotatable conduit; a resilient compressible annulus having a planar base and a substantially lineate protrusion opposite said base, disposed in said recess under slight radial compression, and having the lineate protrusion slidably engaging the inner circumferential surface of said element and the planar base non-slidably seated on the outer circumferential surface of said rotatable conduit; and means supporting said rotatable conduit independently of said sealing means.

9. In a seal for preventing leakage of fluid through a joint between an at least partially submerged rotatively mounted conduit section and a stationary element; a non-rotatable member adjacent and co-operating with the rotative section to provide an annular recess concentric with said section; and a resilient sealing annulus disposed in said recess, said annulus having a planar base non-slidably seated on one circumferential surface of the recess, and a substantially lineate circumferentially-extending protrusion opposite said base slidably engaging the opposed circumferential surface of said recess.

ARTHUR C. LIND.
FRANK G. STULLER.